United States Patent
Sunaga

(10) Patent No.: US 9,116,637 B2
(45) Date of Patent: Aug. 25, 2015

(54) CONTROL DEVICE, STORAGE DEVICE, AND COMPUTER-READABLE RECORDING MEDIUM HAVING STORED THEREIN CONTROL PROGRAM

(71) Applicant: FUJITSU LIMITED, Kawasaki-shi, Kanagawa (JP)

(72) Inventor: Kazuyuki Sunaga, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 157 days.

(21) Appl. No.: 13/915,656

(22) Filed: Jun. 12, 2013

(65) Prior Publication Data

US 2014/0040545 A1    Feb. 6, 2014

(30) Foreign Application Priority Data

Aug. 3, 2012    (JP) ................. 2012-173336

(51) Int. Cl.
*G06F 13/00*    (2006.01)
*G06F 3/06*    (2006.01)
G06F 13/10    (2006.01)
G06F 3/00    (2006.01)
G06F 13/38    (2006.01)

(52) U.S. Cl.
CPC .......... *G06F 3/0689* (2013.01); *G06F 3/0607* (2013.01); *G06F 3/0619* (2013.01); *G06F 3/0632* (2013.01); *G06F 3/0638* (2013.01); *G06F 3/00* (2013.01); *G06F 13/10* (2013.01); *G06F 13/385* (2013.01)

(58) Field of Classification Search
CPC .......... G06F 13/10; G06F 3/00; G06F 13/385
See application file for complete search history.

(56) References Cited

U.S. PATENT DOCUMENTS 8,131,926 B2    3/2012  Lubbers et al.
2012/0254513 A1*  10/2012  Uehara et al. ................. 711/103

FOREIGN PATENT DOCUMENTS

JP    05-54546    3/1993
JP    2006-120120    5/2006

* cited by examiner

*Primary Examiner* — Zachary K Huson
(74) *Attorney, Agent, or Firm* — Fujitsu Patent Center

(57) ABSTRACT

A control device controlling a plurality of disk devices to which a physical storage area is assigned in response to a logical storage area accessed from an upper device includes a processor, and the processor assigns an assignment start location of the logical storage area of the plurality disk devices to respectively different physical locations.

17 Claims, 20 Drawing Sheets

FIG. 3

| SLOT NUMBER (HDD NUMBER) | 8 | 9 | 10 | 11 |
|---|---|---|---|---|
| INSTALLED HDD | — | — | — | — |
| SLOT NUMBER (HDD NUMBER) | 4 | 5 | 6 | 7 |
| INSTALLED HDD | HDD4-5 | — | — | — |
| SLOT NUMBER (HDD NUMBER) | 0 | 1 | 2 | 3 |
| INSTALLED HDD | HDD4-1 | HDD4-2 | HDD4-3 | HDD4-4 |

RELATIONSHIP BETWEEN LOCATION OF MAGNETIC HEAD AND DRIVING CURRENT OF ACTUATOR

SEEK STATE OF MAGNETIC HEAD ON MAGNETIC DISK

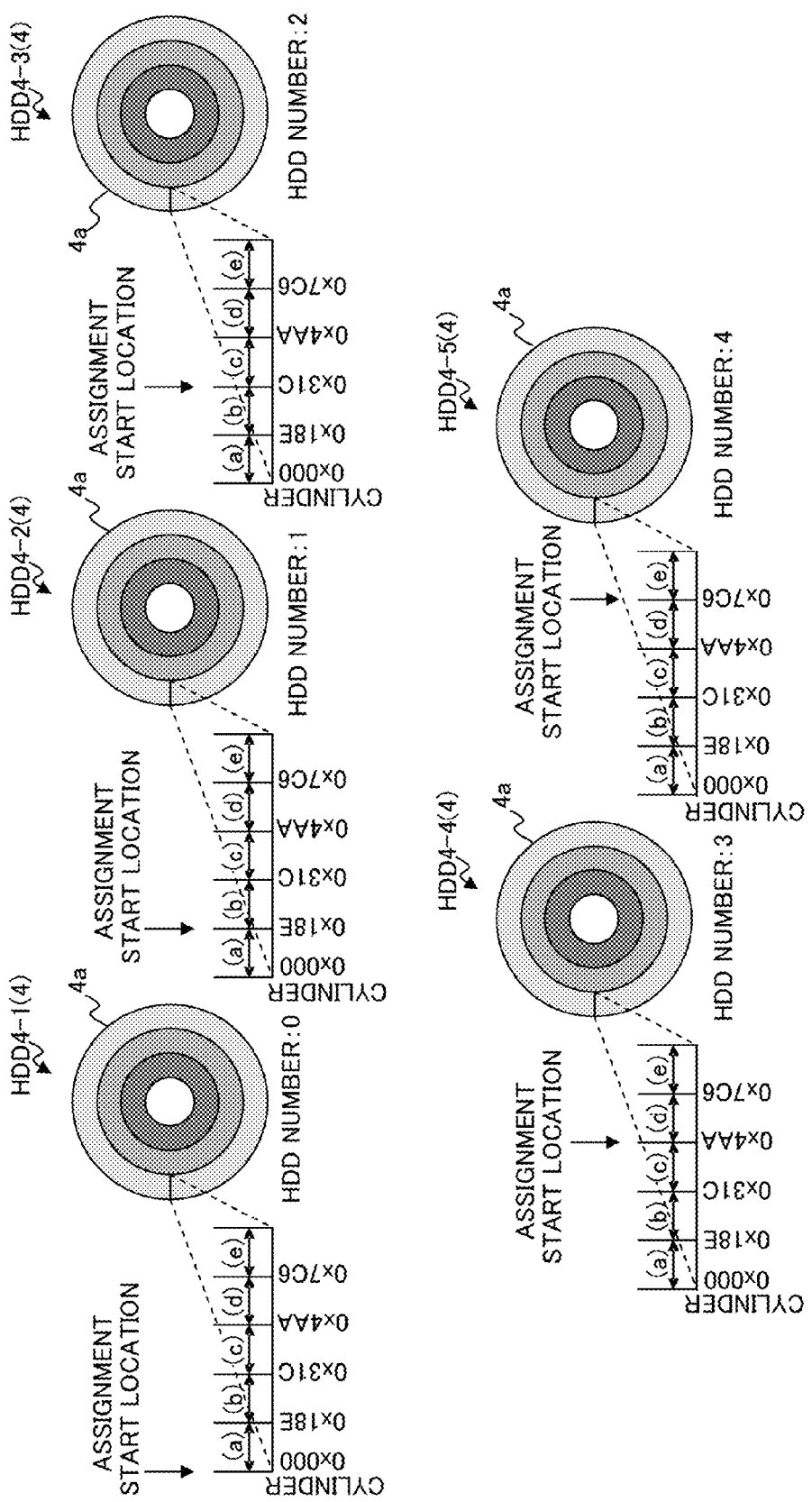

FIG. 8

| INSTALLED HDD | AREA / HDD NUMBER | (a) | (b) | (c) | (d) | (e) |
|---|---|---|---|---|---|---|
| HDD4-1 | 0 | 1 | 2 | 3 | 4 | 5 |
| HDD4-2 | 1 | 2 | 3 | 4 | 5 | 1 |
| HDD4-3 | 2 | 3 | 4 | 5 | 1 | 2 |
| HDD4-4 | 3 | 4 | 5 | 1 | 2 | 3 |
| HDD4-5 | 4 | 5 | 1 | 2 | 3 | 4 |

FIG. 9

231: LOGICAL VOLUME MANAGEMENT INFORMATION

| | OUTERMOST | | INNERMOST | | LOGICAL VOLUME ASSIGNMENT START LOCATION | |
|---|---|---|---|---|---|---|
| | CHS | LBA | CHS | LBA | CHS | LBA |
| HDD4-1 | 00000-00-000000 | 00000000 | 00175B-00-000000 | 446284E4 | 00000-00-000000 | 00000000 |
| HDD4-2 | | | | | 0018E-00-000000 | 0000018E |
| HDD4-3 | | | | | 0031C-00-000000 | 0000031C |
| HDD4-4 | | | | | 004AA-00-000000 | 000004AA |
| HDD4-5 | | | | | 007C6-00-000000 | 000007C6 |

FIG. 10

232: HDD MANAGEMENT INFORMATION
(DISK DEVICE MANAGEMENT INFORMATION)

| AREA | HDD4-1 | | | |
|---|---|---|---|---|
| | MINIMUM VALUE | | MAXIMUM VALUE | |
| | CHS | LBA | CHS | LBA |
| (a) | 00000-00-000000 | 00000000 | - | - |
| (b) | 0018E-00-000000 | 0000018E | - | - |
| (c) | 0031C-00-000000 | 0000031C | - | - |
| (d) | 004AA-00-000000 | 000004AA | - | - |
| (e) | 007C6-00-000000 | 000007C6 | 00953-xx-xxxxxx | 00000953 |
| ... | HDD4-2 | | | |
| ... | ... | ... | ... | ... |

FIG. 11

| SLOT NUMBER (HDD NUMBER) | 8 | 9 | 10 | 11 |
|---|---|---|---|---|
| INSTALLED HDD | — | — | — | — |
| SLOT NUMBER (HDD NUMBER) | 4 | 5 | 6 | 7 |
| INSTALLED HDD | HDD4-5 | HDD4-6 | HDD4-7 | HDD4-8 |
| SLOT NUMBER (HDD NUMBER) | 0 | 1 | 2 | 3 |
| INSTALLED HDD | HDD4-1 | HDD4-2 | HDD4-3 | HDD4-4 |

FIG. 12

| INSTALLED HDD | AREA / HDD NUMBER | (a) | (b) | (c) | (d) | (e) |
|---|---|---|---|---|---|---|
| HDD4-1 | 0 | 1 | 2 | 3 | 4 | 5 |
| HDD4-2 | 1 | 2 | 3 | 4 | 5 | 1 |
| HDD4-3 | 2 | 3 | 4 | 5 | 1 | 2 |
| HDD4-4 | 3 | 4 | 5 | 1 | 2 | 3 |
| HDD4-5 | 4 | 5 | 1 | 2 | 3 | 4 |
| HDD4-6 | 5 | 1 | 2 | 3 | 4 | 5 |
| HDD4-7 | 6 | 2 | 3 | 4 | 5 | 1 |
| HDD4-8 | 7 | 3 | 4 | 5 | 1 | 2 |

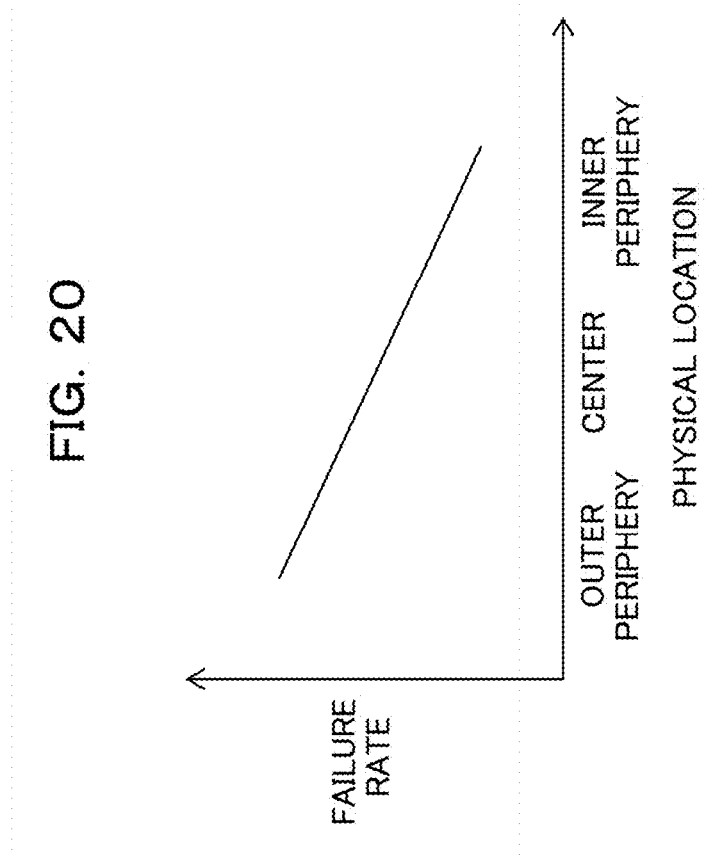

CONTROL DEVICE, STORAGE DEVICE, AND COMPUTER-READABLE RECORDING MEDIUM HAVING STORED THEREIN CONTROL PROGRAM

CROSS-REFERENCE TO RELATED APPLICATION

This application is based upon and claims the benefit of priority of the prior Japanese Patent Application No. 2012-173336, filed on Aug. 3, 2012, the entire contents of which are incorporated herein by reference.

FIELD

The invention relates to a control device, a storage device, and a computer-readable recording medium having stored therein a control program.

BACKGROUND

As a storage device in which a plurality of hard disk drives (HDDs) is handled as one logical volume, a redundant arrays of inexpensive disks (RAID) device is known. FIG. 19 is a diagram illustrating a configuration example of a RAID device 100.

As illustrated in FIG. 19, the RAID device 100 includes a controller module (hereinafter, referred to as a CM) 200 and a disk enclosure (hereinafter, referred to as a DE) 300. Further, the DE 300 stores a plurality of HDDs 400-1 to 400-5.

The CM 200 includes a RAID controller 210 and an input/output (I/O) controller 220. The RAID controller 210 primarily controls the entirety of the RAID device 100 and the I/O controller 220 primarily controls an input/output (command) with the HDDs 400-1 to 400-5.

In general, since an outer periphery of an embedded disk (platter) is more excellent than an inner periphery of the embedded disk in performance of the HDD, the HDD is used toward the inner periphery from the outer periphery of the disk. Note that, the reason why the outer periphery and the inner periphery of the disk are different from each other in performance is that the outer periphery has more bits per track than the inner periphery and a movement frequency between tracks by a magnetic head is low. In addition, one of the reasons is that a peripheral velocity of the outer periphery is higher than that of the inner periphery, and a reading/writing speed of the outer periphery by the magnetic head is higher than that of the inner periphery because a distance of the outer periphery is further than the inner periphery from a rotational shaft of the disk.

Note that, a related technology, there is a technology in which a spindle period control circuit is provided in a disk array device, spindle motors of a plurality of magnetic disk devices take rotational synchronization, and spindle motors of a plurality of other magnetic disk devices take rotational synchronization with a phase shifted from a phase of the plurality of magnetic disk devices. In the technology, a constraint is provided in an address conversion sequence to consecutively read/write data without being accompanied by rotational stand-by even in reading/writing throughout the track (see, for example, Patent Literature 1).

Further, as another related technology, there is a technology of selectively assigning a stripe of a plurality of lines along an axial direction to determine a previously selected storage area to a storage container including a plurality of storage areas along an axial direction of an additional axis (see, for example, Patent Literature 2).

[Patent Literature 1]: Japanese Laid-open Patent Publication No. 05-54546
[Patent Literature 2]: Japanese Laid-open Patent Publication No. 2006-120120

FIG. 20 is a diagram illustrating one example of failure rate of a near-line HDD depending on a physical location of a disk. In the RAID device, a use amount depending on the physical location of the disk of the HDD is more on the outer periphery than on the inner periphery in order to prioritize performance. As a result, as illustrated in FIG. 20, in particular, the failure rate depending on the physical location of the disk of the near-line HDD, which is cheap, and has a large capacity and low quality, is higher on the outer periphery than on the inner periphery.

However, a recovery time of the RAID device, when the HDD is faulty, follows a course of lengthening by an increase in processing time such as rebuilding or copying back of a logical volume accompanied by the recent large capacity of the HDD. Further, with the lengthening of the recovery time of the RAID device, an occurrence probability of multiple failures in which another HDD is faulty until a recovery of the RAID device also increases, and as a result, a data loss possibility by the multiple failures of the HDD increases. Further, as described above, a high failure rate of the outer periphery of the disk is also one cause of the increase in occurrence probability of the multiple failures of the HDD.

Note that, in each of the aforementioned related technologies, the aforementioned problems are not considered.

SUMMARY

According to an aspect of the embodiments, a control device controlling a plurality of disk devices to which a physical storage area is assigned in response to a logical storage area accessed from an upper device, includes a processor, wherein the processor assigns an assignment start location of the logical storage area of the plurality of disk devices to respectively different physical locations.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating one example of HDDs mounted on slots of a DE illustrated in FIG. 1;

FIG. 7 is a diagram illustrating one example of the relationship of physical locations of the disk and a cylinder of each HDD illustrated in FIG. 1;

FIG. 8 is a diagram illustrating an assignment order of a cylinder in each HDD illustrated in FIG. 7;

FIG. 9 is a diagram illustrating one example of logical volume management information held by a holding unit illustrated in FIG. 2;

FIG. 10 is a diagram illustrating one example of HDD management information held by the holding unit illustrated in FIG. 2;

FIG. 11 is a diagram illustrating one example of HDDs additionally mounted on the slots of the DE illustrated in FIG. 3;

FIG. 12 is a diagram illustrating an assignment order of a cylinder in each HDD illustrated in FIG. 11;

FIG. 20 is a diagram illustrating one example of a failure rate of a near-line HDD depending on a physical location of a disk.

DESCRIPTION OF EMBODIMENTS

Hereinafter, embodiments will be described with reference to the drawings.

[1] Embodiment

[1-1] Description of Storage System

Figure 1:
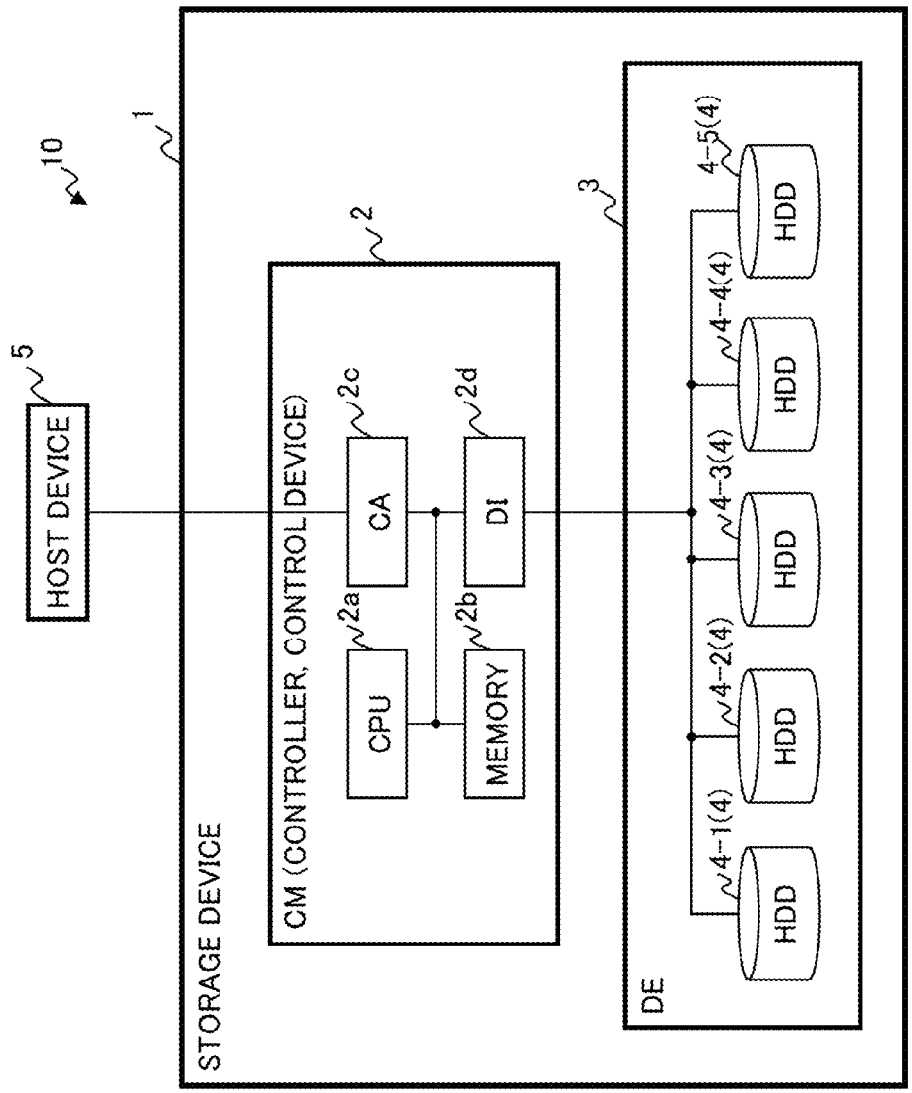
FIG. 1 is a block diagram illustrating a hardware configuration example of a storage system according to an embodiment.

FIG. 1 is a block diagram illustrating a hardware configuration example of a storage system 10 according to an embodiment. As illustrated in FIG. 1, the storage system 10 includes a storage device 1 and a host device 5.

The storage device 1 performs various processes for HDDs 4-1 to 4-5 managed by the storage device 1 in accordance with various requests from the host device 5. Note that, as the storage device 1, a RAID device may be used. As illustrated in FIG. 1, the storage device 1 includes a controller module (CM) 2 and a disk enclosure (DE) 3.

The DE 3 includes a plurality of (for example, five) HDDs 4-1 to 4-5 (just referred to as HDD 4 when the HDDs are not distinguished from each other in the following description) mounted thereon.

The HDD (disk device) 4 is one example of a magnetic disk device and is hardware storing user data, control information, programs, or the like. Hereinafter, each HDD 4 will be described as a near-line HDD corresponding to a serial attached small computer system interface ((SCSI) SAS).

Further, in the embodiment, the plurality of HDDs 4-1 to 4-5 configures a disk group such as a RAID group, or the like and the DE 3 manages the disk group as a storage resource pool. Physical storage areas of the plurality of HDDs 4 are assigned corresponding to logical volumes (logical storage areas) accessed from an upper device such as the host device 5, or the like, respectively.

The CM (controller, control device) 2 is connected to the DE 3 and the host device 5 and performs various processes for the DE 3 (HDD 4) in accordance with the requests from the host device 5.

As illustrated in FIG. 1, the CM 2 includes a central processing unit (CPU) $2a$, a memory $2b$, a channel adapter (CA) $2c$, and a disk interface (DI) $2d$.

The CPU $2a$ is one example of a processing device (processor) that is connected with each of the memory $2b$, the CA $2c$, and the DI $2d$ to perform various controls or computations. The CPU $2a$ executes a program stored in the memory $2b$, the HDD 4 in the DE 3, or a read only memory (ROM) (not illustrated) to implement various functions in the CM 2. The CPU $2a$ according to the embodiment executes a control program stored in the memory $2b$, the HDD 4, or the ROM to function as a RAID controller 21 (including a condition judging unit 211, an offset amount determining unit 212, and a logical volume assigning unit 213) and an I/O controller 22, to be described below.

The memory $2b$ is a storage device such as a cache memory temporarily storing various data or programs, and is used for temporarily storing and expanding data or program when the CPU $2a$ executes the program. For example, the memory $2b$ temporarily stores a program for the CPU $2a$ to function as the controller, data written in the HDD 4 from the host device 5, or data read out to the host device 5 from the HDD 4. Note that, as the memory $2b$, a volatile memory such as a random access memory (RAM) may be used.

The CA $2c$ is an adapter that is connected with the host device 5 to perform an interface control with the host device 5 and performs a data communication with the host device 5. The DI $2d$ performs an interface control with the DE 3 housed in the storage device 1.

[1-2] Description of CM

Next, the CM 2 according to the embodiment will be briefly described.

As described above with reference to FIG. 20, the failure rate depending on the physical location of the disk of the near-line HDD which is particularly cheap, and has a large capacity and low quality is higher on the outer periphery than on the inner periphery. Further, high failure rate of the outer periphery of the disk causes a data loss possibility by multiple failures of the HDD to be high.

If a use amount (access amount) of the outer periphery may be at least even by considering that the failure rate of the HDD is associated with the use amount (access amount) of the disk and that the outer periphery, the center, and the inner periphery of the disk are different from each other in use amount (access amount), it is considered that an occurrence possibility of the multiple failures of the HDD may be reduced.

A physical location used in the HDD constituting the disk group such as the RAID group is determined when the logical volume (logical storage area) is assigned. Therefore, when respective assignment start locations are made different from each other by considering the assignment start location of the logical volume for each HDD constituting the RAID group, different physical access may be implemented for each HDD constituting the RAID group. As a result, the failure rate of the outer periphery may be at least averaged (see FIG. 17) and the occurrence probability of the multiple failures (simultaneous failures) of the HDD may be reduced.

Therefore, the CM 2 according to the embodiment performs a control of assigning the logical volume with the respective HDDs 4 having different offsets at least on the outer periphery of the disk so that physical use start locations of the storage areas of the plurality of HDDs 4 constituting the RAID group are different from each other.

[1-3] Configuration Example of CM

Figure 2:
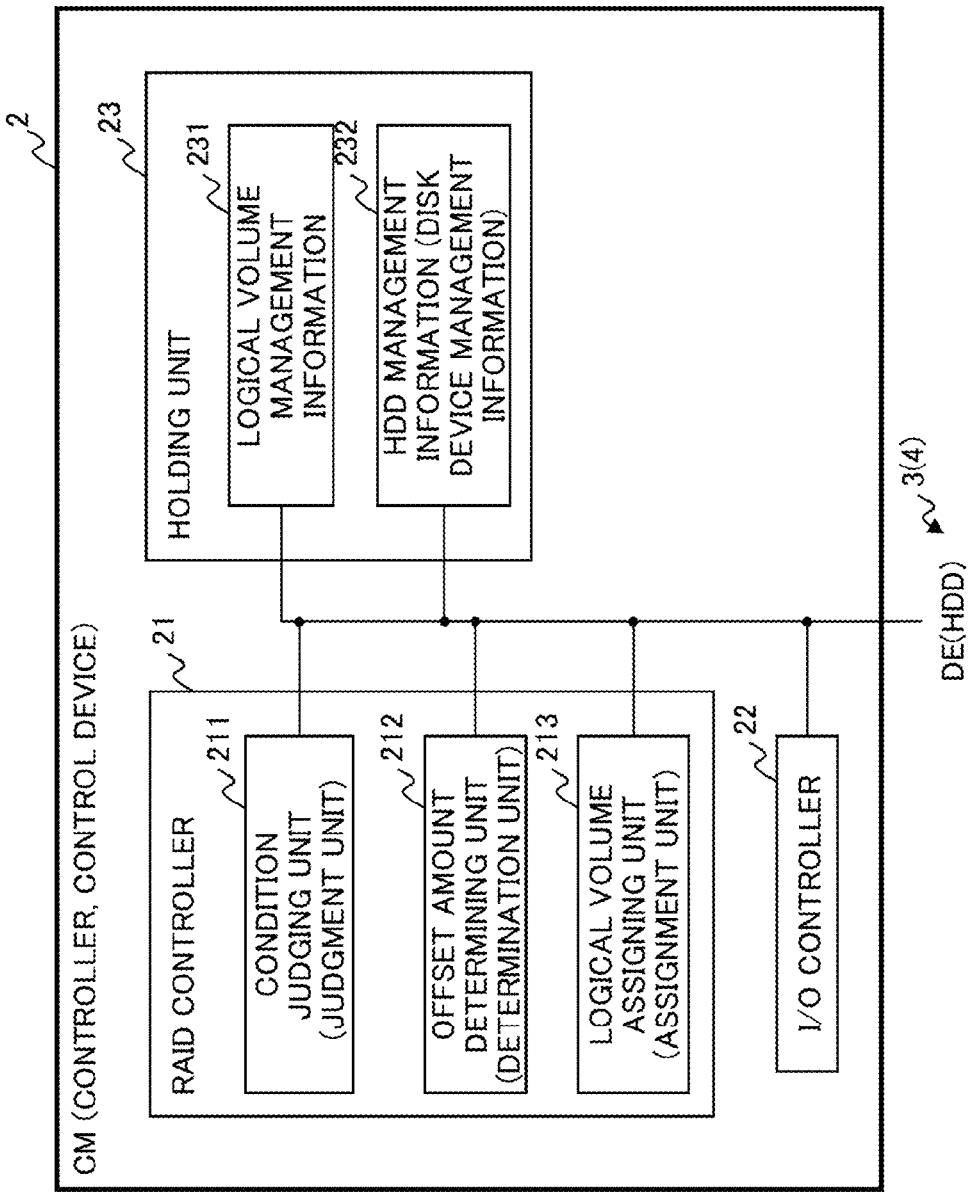
FIG. 2 is a block diagram illustrating a functional configuration example of a CM illustrated in FIG. 1.

Hereinafter, a functional configuration example of the aforementioned CM 2 that controls the plurality of HDDs 4 will be described. FIG. 2 is a block diagram illustrating the functional configuration example of the CM 2 illustrated in FIG. 1. FIG. 3 is a diagram illustrating one example of the HDDs 4 mounted on slots of the DE 3. As illustrated in FIG. 3, the HDDs 4-1 to 4-5 are mounted (connected) onto slot numbers 0 to 4 of slots (not illustrated) of the DE 3, respectively.

As illustrated in FIG. 2, the CM 2 includes the RAID controller 21, the I/O controller 22, and a holding unit 23.

The I/O controller 22 controls the input/output (command) with the HDDs 4-1 to 4-5 and for example, reads/writes data in accordance with the requests from the host device 5, or the like.

The RAID controller 21 controls the entirety of the storage device 1 and for example, performs a making-up process of the RAID group, an assignment/releasing process of the logical volume, or the like in accordance with the requests from the host device 5, or the like. The RAID controller 21 includes the condition judging unit 211, the offset amount determining unit 212, and the logical volume assigning unit 213.

The condition judging unit (judgment unit) 211 judges whether the respective HDDs 4 constituting the RAID group are assignment target HDDs (hereinafter, referred to as application target HDD) of the logical volume (logical storage area) based on the offset amount by the logical volume assigning unit 213 to be described below. In detail, the condition judging unit 211 judges whether each of the plurality of HDDs 4 constituting the RAID group satisfies conditions (i) to (iv) below.

(i) A type of the HDD 4 is the near-line HDD.
(ii) A RAID type is RAID 5 or RAID 6.
(iii) The HDDs 4 constituting the RAID group include the same performance.
(iv) Other RAID groups are not assigned to the respective HDDs 4.

Note that, in regard to condition (i), the condition judging unit 211 judges that each HDD 4 is the near-line HDD, for example, when a disk rotational speed is less than a predetermined value (for example, 10000 rpm) based on information on each HDD 4. Note that, in the case where the HDDs 4 which correspond to another standard such as serial advanced technology attachment (SATA) other than the SAS are mixably mounted on the DE 3, the condition judging unit 211 may judge that the HDD 4 is the near-line HDD when the HDD 4 is a disk device corresponding to the SAS.

Further, in regard to condition (ii), the RAID type may include RAID 1, RAID 1+0, RAID 5+0, RAID 6+0, and the like other than RAIDS 5 and 6.

In addition, in regard to condition (iii), the condition judging unit 211 judges, for example, that the respective HDDs 4-1 to 4-5 include the same performance when the disk rotational speeds of the HDDs 4 are the same as each other (for example, the rotational speeds of all of the HDDs 4 are 7200 rpm, or the like), based on the information on the respective HDDs 4-1 to 4-5.

In the making-up process of the RAID group by the RAID controller 21, for example, the RAID type of the RAID group being made, the HDDs 4 constituting the RAID group, and information on the number of the HDDs 4 (information on the plurality of HDDs 4) are selected by a user or a manager. Therefore, the condition judging unit 211 may judge whether the respective HDDs 4 satisfy the condition based on the selected information on the plurality of HDDs 4 after the RAID group being made is determined through the selection.

As one example, in the case where it is determined that the RAID group of the RAID 5 is prepared by using the HDDs 4-1 to 4-5 which are not assigned to another RAID group, it is assumed that the rotational speed of each HDD 4 is 7200 rpm. In this case, the condition judging unit 211 judges that all of the HDDs 4-1 to 4-5 satisfy the conditions (i) to (iv) and judges that all of the HDDs 4-1 to 4-5 are the application target HDDs.

Note that, for example, the RAID controller 21 may store information to define the conditions (i) to (iv) or information on the plurality of HDDs 4 constituting the RAID group being made in the storage area such as the memory 2b of the CM 2. Further, the condition judging unit 211 preferably stores the information on the HDDs 4 judged as the application target HDDs and the number of the corresponding HDDs 4 in the storage area such as the memory 2b in order to use the information on the HDDs 4 and the number of the corresponding HDDs 4 in the offset amount determining unit 212 to be described below.

Further, the condition judging unit 211 may omit performing judgment of a part of the conditions (i) to (iv) and may perform judgment for at least one of the conditions (i) to (iv).

The offset amount determining unit (determination unit) 212 determines offset amounts of physical locations in the plurality of HDDs 4. The offset amounts are used to acquire the assignment start locations of the logical volumes for the plurality of HDDs 4 constituting the RAID group by the logical volume assigning unit 213 to be described below. Note that, when the judgment process by the condition judging unit 211 is performed, the offset amount determining unit 212 determines the offset amounts for the HDDs 4 judged as the application targets HDDs by the condition judging unit 211.

Herein, as described above, the CM 2 allows the plurality of HDDs 4 constituting the RAID group to include different offset amounts to assign the logical volumes, thereby suppressing simultaneous failure occurrence of the plurality of HDDs 4. In this case, it is preferable that an area having the offset is an outer periphery among portions acquired by dividing the physical location of the entire disk into three, as described above.

Figure 4B:
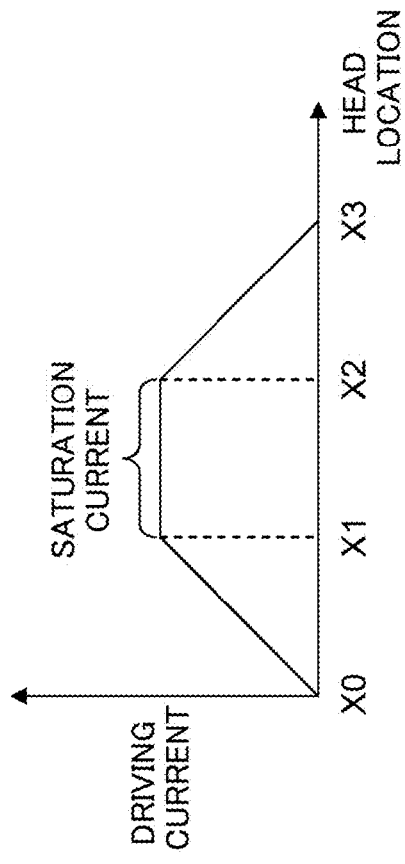
FIGS. 4A and 4B are diagrams illustrating one example of the relationship between a seeking distance and driving current of a magnetic head of the HDD illustrated in FIG. 1.
Figure 4A:
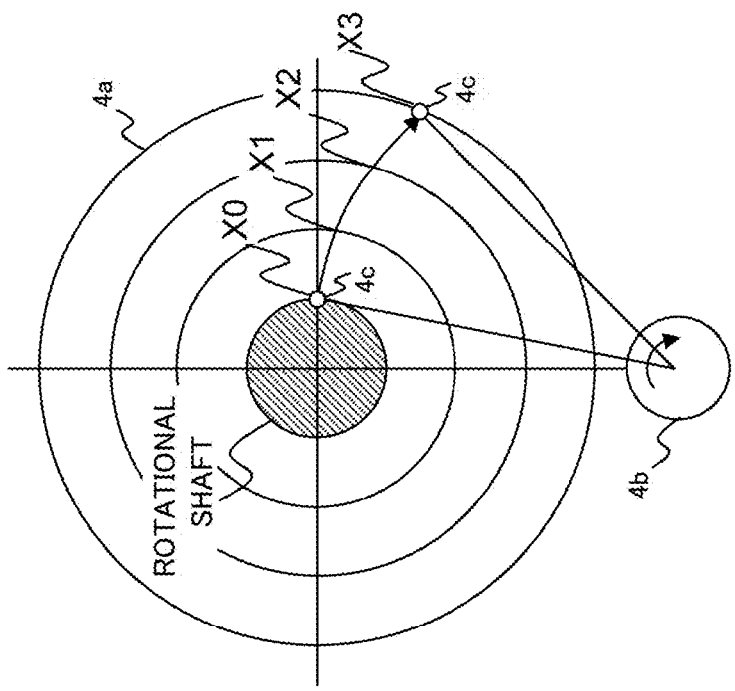
Figure 5:
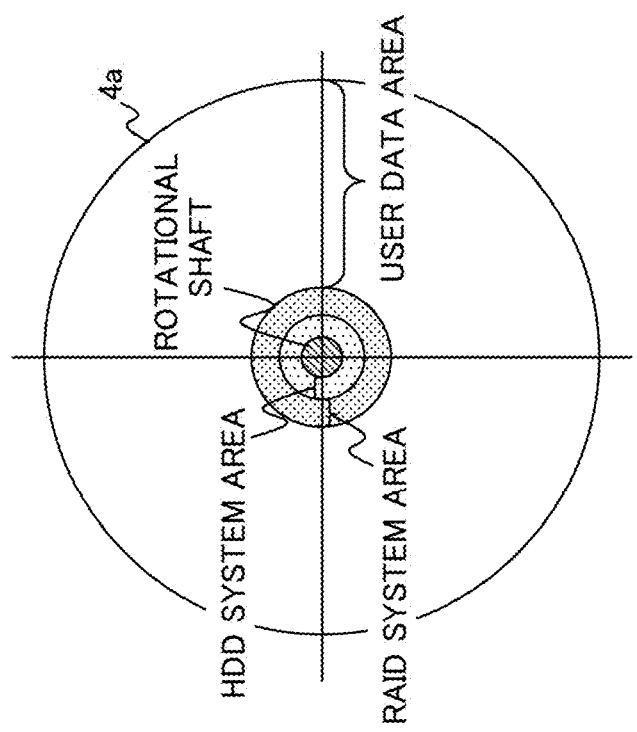
FIG. 5 is a diagram illustrating each area of the magnetic disk of the HDD illustrated in FIG. 1.
Figure 6A:
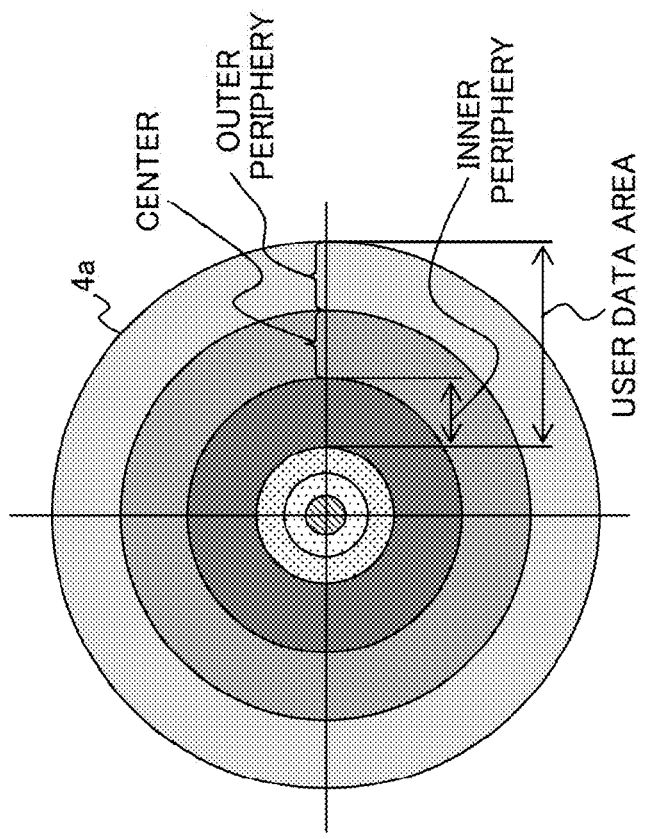
FIGS. 6A and 6B are diagrams illustrating a range acquired by dividing a physical location of a disk into three equal parts.
Figure 6B:
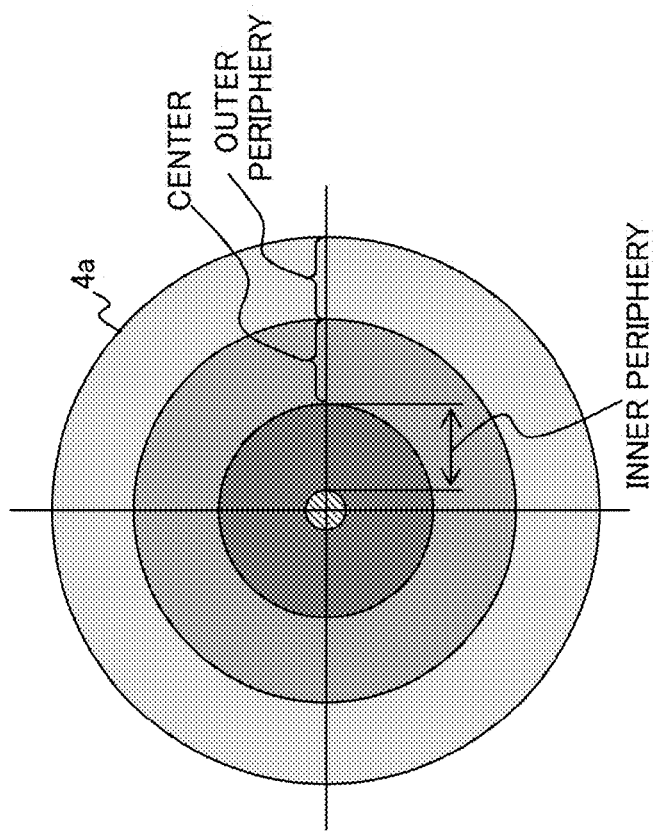

The reason for dividing the physical location of the disk into three equal parts is that a mode in which a saturation current time is not present by a seek control of a magnetic head (hereinafter, just referred to as a head) is ⅓ seeking of seeking from an innermost portion (innermost peripheral location) of the disk to an outermost portion (outermost peripheral location) of the disk. FIGS. 4A and 4B are diagrams illustrating one example of the relationship between a seeking distance of a head 4c of the HDD 4 and driving current illustrated in FIG. 1, in particular, FIG. 4A is a diagram illustrating a seeking status of the head 4c on a magnetic disk (hereinafter, just referred to as a disk) 4a, and FIG. 4B is a diagram illustrating the relationship between the location of the head 4c and driving current of an actuator 4b. FIG. 5 is a diagram describing each area of the disk 4a of the HDD 4 illustrated in FIG. 1. FIGS. 6A and 6B are diagrams illustrating ranges acquired by dividing the physical location of the disk 4a into three equal parts, in particular, FIG. 6A is a diagram illustrating the ranges of trisection in the case of including a system area, and FIG. 6B is a diagram illustrating the ranges of trisection in the case of not including the system area.

For example, a case of seeking the head 4c from an innermost portion X0 of the disk 4a to an outermost portion X3 of the disk 4a by using the actuator 4b of the HDD 4 is considered (see FIG. 4A). Note that, X1 and X2 illustrated in FIG. 4A indicate respective locations acquired by dividing the number of cylinders from the innermost portion X0 to the outermost portion X3 into three equal parts. In this case, as illustrated in FIG. 4B, the driving current of the actuator 4b increases linearly while the location of the head 4c is sought from X0 to X1, the driving current of the actuator 4b becomes saturation current while the location of the head 4c is sought from X1 to X2, and the driving current of the actuator 4b decreases linearly while the location of the head 4c is sought from X2 to X3.

A time (saturation current time) when the driving current of the actuator 4b becomes the saturation current, that is, when a case in which the head 4c seeks a distance (track) of ⅓ or more between the innermost portion X0 to the outermost portion X3, a stand-by time is generated in a seeking control of the actuator 4b. The generation of the stand-by time in the seeking control causes the performance of the HDD 4 to be degraded.

Therefore, the RAID controller 21 sets an area within a ⅓ range of the physical location of the disk 4a, which is a limit distance where the stand-by time is not generated in the seeking control, as an area of a target to which the logical volume is assigned by allowing the respective HDDs 4 to include different offsets.

Note that, as illustrated in FIG. 5, the disk 4a of the HDD 4 includes an HDD system area managed by a vendor of the HDD, a RAID device system area managed by the RAID controller 21, and a user data area, in the order toward the outer periphery from the rotational shaft of the center. Hereinafter, the HDD system area and the RAID device system area are collectively called a system area. Note that, the logical volume is assigned to the user data area (data storage area).

The RAID controller 21 may set the range of the outer periphery among portions acquired by dividing an area from the innermost portion to the outermost portion, which includes the system area, into three equal parts, as a range having an offset, as illustrated in FIG. 6A. Alternatively, the RAID controller 21 may set the range of the outer periphery among portions acquired by dividing an area (that is, the user data area) from the innermost portion to the outermost portion, which does not include the system area, into three equal parts, as a range having an offset, as illustrated in FIG. 6B.

Referring back to FIG. 2, the offset amount determining unit 212 will be described in detail.

The offset amount determining unit 212 determines an offset amount based on any one range of a plurality of ranges acquired by partitioning the entire data storage area in at least one HDD 4 among the plurality of HDDs 4 and the number of the plurality of HDDs 4. As one example, as described with reference to FIGS. 4A, 4B, 5, 6A and 6B, when the range having the offset is set as the range of the outer periphery, the offset amount determining unit 212 determines the offset amount based on the range of the outer periphery and the number of the plurality of HDDs 4 as described below.

In detail, the offset amount determining unit 212 acquires the number of all cylinders of the head 4c for each of the plurality of HDDs 4 (application target HDDs 4 when the judgment is made by the condition judging unit 211) constituting the RAID group. Note that, when the HDD 4 includes a plurality of platters, the offset amount determining unit 212 may acquire the number of all cylinders of the head 4c of any one (for example, "Head0").

In more detail, the offset amount determining unit 212 performs cylinder head sector-logical block addressing (CHS-LBA) conversion with respect to outermost and innermost cylinders and acquires the number of all cylinders and LBA per disk 4a, with respect to the plurality of HDDs 4.

Note that, the offset amount determining unit 212 may representatively acquire the number of all cylinders and the LBA only for the HDD 4-1 (see FIG. 3) mounted on a least slot (slot number "0"), for example.

Subsequently, the offset amount determining unit 212 acquires (calculates) the number of cylinders of the outer periphery of the plurality of HDDs 4 (alternatively, application target HDDs 4) constituting the RAID group or the HDD 4-1 mounted on the least slot, by dividing the acquired number of all cylinders into three equal parts. Then, the offset amount determining unit 212 determines (calculates) an offset cylinder amount (offset amount) by partitioning the acquired number of cylinders of the outer periphery into the number of the plurality of HDDs 4 (alternatively, application target HDDs 4) constituting the RAID group. Hereinafter, the offset amount determining unit 212 representatively determines the offset amount based on the number of cylinders of the outer periphery of the HDD 4-1.

In the aforementioned example, the offset amount determining unit 212 determines an offset cylinder amount in a radial direction (cylinder address direction) of the disk 4a as an offset amount.

However, the offset amount is not limited to the offset cylinder amount. For example, the offset amount may be an offset sector amount in a circumferential direction (sector address direction) of the disk 4a or an offset header amount in a rotational axis direction (header address direction) of the plurality of disks 4a (platters) of the HDD 4. Alternatively, the offset amount may be any combination of the offset cylinder amount, the offset sector amount, and the offset header amount.

The offset amount determining unit 212 acquires, for example, the number of sectors on the outer periphery and partitions the acquired number of sectors into the number of the plurality of HDDs to determine (calculate) the offset sector amount (offset amount) when the offset sector amount is included in the offset amount. Note that, since the number of sectors depends on a radial location of the disk 4a, the offset amount determining unit 212 may acquire (calculate) the maximum (outermost peripheral location) number or the average number of sectors in a range to set the offset.

Further, the offset amount determining unit 212 acquires the number of platters of the HDD 4 and partitions the acquired number of platters into the number of the plurality of HDDs 4 to determine (calculate) the offset header amount (offset amount) when the offset header amount is included in the offset amount.

The logical volume assigning unit (assignment unit) 213 assigns the assignment start locations of the logical volumes of the plurality of HDDs 4 to different physical locations, respectively. In this case, the logical volume assigning unit 213 assigns the logical volume so that one or more addresses of a cylinder address (radial location), a sector address (circumferential location), and a head address (platter location) are different from each other in the plurality of HDDs 4.

In detail, the logical volume assigning unit 213 acquires assignment start locations which deviate from each other by the offset amount and assigns the logical volume from the assignment start locations of the plurality of respective HDDs 4 (alternatively, application target HDDs), with respect to the plurality of respective HDDs 4 (alternatively, application target HDDs).

Note that, the logical volume assigning unit 213 performs the aforementioned control when the RAID controller 21 assigns a resource to a new logical volume from the storage resource pool (RAID group) managed by the DE 3, in accordance with the requests from the host device 5, or the like.

As one example, the logical volume assigning unit 213 assigns the logical volume so that the cylinder addresses are different from each other in the plurality of HDDs 4, as described below, when the offset cylinder amount is calculated as the offset amount.

In detail, the logical volume assigning unit 213 acquires assignment start locations which deviate from each other by the offset amount in the radial direction of the disk 4a and assigns the logical volume from the assignment start locations of the plurality of respective HDDs 4, with respect to the plurality of respective HDDs 4.

In more detail, the logical volume assigning unit 213 acquires the product of the offset amount (the number of cylinders) and the HDD number (slot number, see FIG. 3) constituting the RAID group. FIG. 7 is a diagram illustrating one example of the relationship between the disk 4a of each HDD 4 illustrated in FIG. 1 and a physical location of a cylinder. FIG. 8 is a diagram illustrating an assignment sequence of a cylinder in each HDD 4 illustrated in FIG. 7. Note that, FIG. 7 illustrates a case in which the number of disks 4a (platters) is one for simplification of a drawing. Further, in FIG. 7, (a) to (e) illustrate respective areas acquired by dividing the outer periphery into even parts (five even parts) which are the number of HDDs 4.

For example, when the offset amount determined by the offset amount determining unit 212 is "0x18E", the product (cylinder) of the offset amount and the slot number is acquired with respect to the respective HDDs 4-1 to 4-5 mounted on slot 0 to slot 4, in the example illustrated in FIG. 3. In this case, the acquired cylinder is as described below.

Slot 0 (HDD 4-1): "0x18E×0"="0" (no offset)
Slot 1 (HDD 4-2): "0x18E×1"="0x18E"
Slot 2 (HDD 4-3): "0x18E×2"="0x31C"
Slot 3 (HDD 4-4): "0x18E×3"="0x4AA"
Slot 4 (HDD 4-5): "0x18E×4"="0x7C6"

Then, the logical volume assigning unit 213 performs CHS-LBA conversion into "Head0" and "Sector0" by using the product (cylinder) acquired above to acquire the assignment start location of the logical volume in each HDD 4 (see FIG. 7).

The logical volume assigning unit 213 performs a logical format of the logical volume for each HDD 4 in the order of areas illustrated in FIGS. 7 and 8 by considering that areas (a) to (e) are present in the respective HDDs 4 similarly and that the performance of the outer periphery is excellent.

That is, the logical volume assigning unit 213 uses the HDD 4-1 in the same method as a general use order toward an inner peripheral location from an outer peripheral location in each area in the order of the areas (a) to (e) and uses the HDD 4-2 toward the inner peripheral location from the outer peripheral location in each area in the order of the areas (b) to (e) and (a). Further, the logical volume assigning unit 213 uses the HDD 4-3 toward the inner peripheral location from the outer peripheral location in each area in the order of the areas (c) to (e), (a), and (b) and uses the HDD 4-4 toward the inner peripheral location from the outer peripheral location in each area in the order of the areas (d), (e), and (a) to (c).

Further, the logical volume assigning unit 213 uses the HDD 4-5 toward the inner peripheral location from the outer peripheral location in each area in the order of the areas (e), and (a) to (d).

In other words, the logical volume assigning unit 213 assigns an unassigned logical volume from an outermost portion of an allocable storage area when the logical volume is assigned to the innermost portion of the range of the outer periphery and the allocable storage area is present within the range of the outer periphery. Note that, the logical volume assigning unit 213 assigns the unassigned logical volume from the physical location out the range of the outer periphery (for example, the center) when the allocable storage area is not present within the range of the outer periphery. That is, the logical volume assigning unit 213 uses the center and the inner periphery toward the inner peripheral location from the outer peripheral location similarly to a general RAID device when all of the storage areas of the outer periphery of the HDD 4 are used (when all of the storage areas of the outer periphery of the HDD 4 are assigned to the logical volume).

Like this, the logical volume assigning unit 213 allows the outer periphery, which has higher performance than the center or the inner periphery and in which a performance difference is low even when the use order of the storage areas is changed, to include different offsets for each HDD 4 to assign the logical volume. As a result, an occurrence probability of simultaneous failures of the plurality of HDDs 4 may be decreased while suppressing the degradation in performance of the HDD 4.

Note that, the logical volume assigning unit 213 may assign the logical volume even to the center and the inner periphery similarly to the outer periphery in order to increase redundancy. However, there is a possibility that the performance will be degraded as compared with a case of assigning the logical volume only to the outer periphery.

Note that, the logical volume assigning unit 213 assigns another (new) logical volume in accordance with the aforementioned order subsequently to a final location of the logical volume assigned just before in the plurality of respective HDDs 4 when assignment requests of other logical volumes are received from the host device 5, or the like. As a result, when the logical volume assigning unit 213 assigns the logical volume, it is preferable that the logical volume assigning unit 213 updates the assignment start location of the logical volume for each HDD 4 and stores a new assignment start location after updating in the storage area such as the memory 2b or logical volume management information 231 to be described below.

Note that, FIG. 7 illustrates the case in which the number of the disks 4a (platters) in the HDD 4 is one, but in the case in which several disks 4a are present in the HDD 4, the logical volume assigning unit 213 may assign the logical volume or manage and update the assignment start location, for each disk 4a, as described above.

Further, the logical volume assigning unit 213 may assign the logical volume, as described above, by using the offset amount corresponding to each HDD 4 when the offset amount determining unit 212 determines the offset amount for each HDD 4.

Furthermore, the logical volume assigning unit 213 assigns the logical volume from the outermost portion of the storage areas of the respective HDDs 4 judged as not corresponding application target HDDs when at least one HDD 4 among the plurality of HDDs 4 is judged as not the application target HDD by the condition judging unit 211. That is, the logical volume assigning unit 213 uses the HDD 4 judged as not the application target HDD in the same method as the general use order.

Up to here, a case in which the logical volume assigning unit 213 assigns the assignment start locations of the logical volumes of the plurality of HDDs 4 to respective physical locations having different cylinder addresses has been described, but the logical volume assigning unit 213 assigns the logical volume similarly even in the case in which the offset sector amount or the offset header amount is included in the offset amount.

Referring back to FIG. 2, the holding unit 23 is a storage area holding management information of the logical volume or the HDD 4 and for example, is implemented by the memory 2b described above. The holding unit 23 holds the logical volume management information 231 and HDD management information 232. FIG. 9 is a diagram illustrating one example of the logical volume management information 231 held by the holding unit 23 illustrated in FIG. 2. FIG. 10 is a diagram illustrating one example of the HDD management information 232 held by the holding unit 23.

The logical volume management information 231 is information to manage CHS and LBA of the outermost portion and the innermost portion in the HDD 4 and manage the assignment start location of the logical volume for each HDD 4. For example, as illustrated in FIG. 9, "00000-00-000000" and "00000000" are set as the CHS and the LBA of the outermost portion of the disk 4a acquired by the offset amount determining unit 212 and "00175B-00-000000" and "446284E4" are set as the CHS and the LBA as the innermost portion, in the HDD 4-1. Note that, FIG. 9 illustrates the case where the number of all cylinders is representatively acquired only with respect to the HDD 4-1 by the offset amount determining unit 212, and thus the CHS and the LBA of each of the outermost portion and the innermost portion are set only with respect to the HDD 4-1.

Further, as illustrated in FIG. 9, the assignment start location of the logical volume acquired by the logical volume assigning unit 213 is set in each of the HDDs 4-1 to 4-5. As one example, "00000-00-000000" and "00000000" are set in the CHS and the LBA at the assignment start location of the HDD 4-1 and "0018E-00-000000" and "0000018E" are set in the CHS and the LBA at the assignment start location of the HDD 4-2.

The logical volume management information 231 is created when the RAID group is determined by the offset amount determining unit 212 and outermost and innermost information for the HDDs 4 constituting the RAID group is set. Further, information on the logical volume assignment start location is set in the logical volume management information 231 when the logical volume is assigned to the RAID group by the logical volume assigning unit 213. Note that, the logical volume assigning unit 213 may prepare an assignment start location item of the logical volume after updating and use the item in subsequent assignment of the logical volume with respect to the logical volume management information 231 at the time of assigning a new logical volume to the RAID group.

Note that, when the number of all cylinders is acquired with respect to each of the HDDs 4-1 to 4-5 by the offset amount determining unit 212, the CHS and the LBA of the outermost portion and the innermost portion are set for each HDD 4 in FIG. 9. Then, by the offset amount determining unit 212 and the logical volume assigning unit 213, the offset amount and the assignment start location are acquired for each corresponding HDD 4 and set in the logical volume assigning unit 213, based on the outermost and innermost information of each HDD 4.

The HDD management information (disk device management information) 232 is information to manage minimum values of the CHS and the LBA of each of the areas (a) to (d) and minimum values and maximum values of the CHS and the LBA of the innermost area (e), for each HDD 4. For example, as illustrated in FIG. 10, "00000-00-000000" and "00000000" are set in the CHS and the LBA of the minimum values of the area (a) of the HDD 4-1. Further, "007C6-00-000000" and "000007C6" are set in the CHS and the LBA of the minimum values of the area (e) of the HDD 4-1 and "00953-xx-xxxxxx" and "00000953" are set in the maximum value, that is, the CHS and the LBA of the innermost portion of the outer periphery. Note that, when the number of all cylinders is representatively acquired only with respect to the HDD 4-1 by the offset amount determining unit 212, information may be set in the HDD management information 232 only with respect to the HDD 4-1.

Note that, the reason why in FIG. 10, maximum values of the CHS and the LBA in each of the areas (a) to (d) are not illustrated is that the respective maximum values are acquired from the minimum value of one of the inner peripheral areas (b) to (e) of each area.

The HDD management information 232 is created when the logical volume is assigned to the RAID group by the logical volume assigning unit 213 and a result of CHS-LBA conversion is set with respect to the ranges of the areas (a) to (e) of each HDD 4 (alternatively, representatively, HDD 4-1). Like this, the logical volume assigning unit 213 manages the one-to-one relationship between the cylinder and the LBA in the areas (a) to (e) for each HDD 4, by using the HDD management information 232.

The logical volume assigning unit 213 may assign the logical volume to each HDD 4 in accordance with the order illustrated in FIG. 8, based on the assignment start location in the logical volume assigning unit 213 described above, the assignment start location after updating, and information on the HDD management information 232.

Note that, even a value of a header or/and a sector is changed in the CHS illustrated in FIGS. 9 and 10 when the offset sector amount or the offset header amount is included in the offset amount.

[1-3-1] Process in CM when HDD is Additionally Installed or Replaced

Next, in the storage device 1 illustrated in FIG. 1, a process in the CM 2 when the HDD is additionally installed or replaced with respect to the plurality of HDDs 4 constituting the RAID group will be described.

First, a case in which the HDD 4 is additionally installed will be described. FIG. 11 is a diagram illustrating one example of HDDs 4-6 to 4-8 additionally mounted on the slots of the DE 3 illustrated in FIG. 3. FIG. 12 is a diagram illustrating an assignment sequence of a cylinder in each of the HDDs 4-1 to 4-8 illustrated in FIG. 11.

As illustrated in FIG. 11, when the HDDs 4-6 to 4-8 added to the RAID group are mounted on slot numbers 5 to 7 of the DE 3, the logical volume assigning unit 213 determines assignment start locations using an existing offset amount with respect to the additionally installed HDDs 4-6 to 4-8.

In detail, the logical volume assigning unit 213 acquires the assignment start locations so as to use the HDDs 4-6 to 4-8 in the same order as the HDD 4-1 to 4-3, respectively, as illustrated in FIG. 12. In the case where the offset amount is "0x18E", the product (cylinder) of the existing offset amount and "slot number—the number of HDDs 4 at the time of determining the offset amount" is acquired with respect to each of the HDDs 4-6 to 4-8 mounted on the slots 5 to 7, in the example illustrated in FIG. 11. That is, since the number of HDDs 4 at the time of determining the offset amount is "5" as described above, the cylinder at the assignment start location is as below.

Slot 5 (HDD 4-6): "0x18E×(5−5)"="0x18E×0"="0"
Slot 6 (HDD 4-7): "0x18E×(6−5)"="0x18E×1"="0x18E"
Slot 7 (HDD 4-8): "0x18E×(7−5)"="0x18E×2"="0x31C"

Note that, the assignment start location of the additionally installed HDD 4 is not limited to the aforementioned order and the assignment start locations of the plurality of HDDs 4 constituting the RAID group may be at least acquired to be distributed among the areas (a) to (e).

Next, the case in which the plurality of HDDs 4 constituting the RAID group is replaced will be described.

The logical volume assigning unit 213 may adopt any one method of methods described below when any one HDD 4 among the plurality of HDDs 4 constituting the RAID group is replaced.

For example, the logical volume assigning unit 213 may assign the logical volume from the outermost portion of the disk 4*a* which is a using method of a general HDD when the logical volume assigning unit 213 intends to shorten a processing time of rebuild or copy back. That is, the logical volume assigning unit 213 acquires the assignment start location with respect to the HDD 4 after replacing similarly to the HDD 4-1 illustrated in FIGS. 7 and 8 and the RAID controller 21 executes rebuilding or copying back with respect to the HDD 4 after replacing.

Alternatively, the logical volume assigning unit 213 may assign the logical volume so that the same data is conserved at the same physical location as the HDD 4 before replacing when the logical volume assigning unit 213 intends to secure redundancy of the storage device 1.

Note that, the logical volume assigning unit 213 updates the logical volume management information 231 and the HDD management information 232 with respect to the HDD 4 after installation or replacing when the HDD 4 is additionally installed or replaced.

[1-3-2] Process of CM when Logical Volume is Released or Reassigned

Next, a process of the CM 2 (RAID controller 21) when the logical volume assigned to the RAID group is released or reassigned will be described.

In the storage device 1 according to the embodiment, one HDD 4 does not serve as a plurality of RAID types (RAID groups). That is, the RAID group is not changed regardless of releasing or reassigning the logical volume. Therefore, the outer periphery (a range to which the offset being applied) of the disk 4*a* is used in the aforementioned order by the logical volume assigning unit 213 regardless of an assignment amount of the logical volume.

Figure 13:
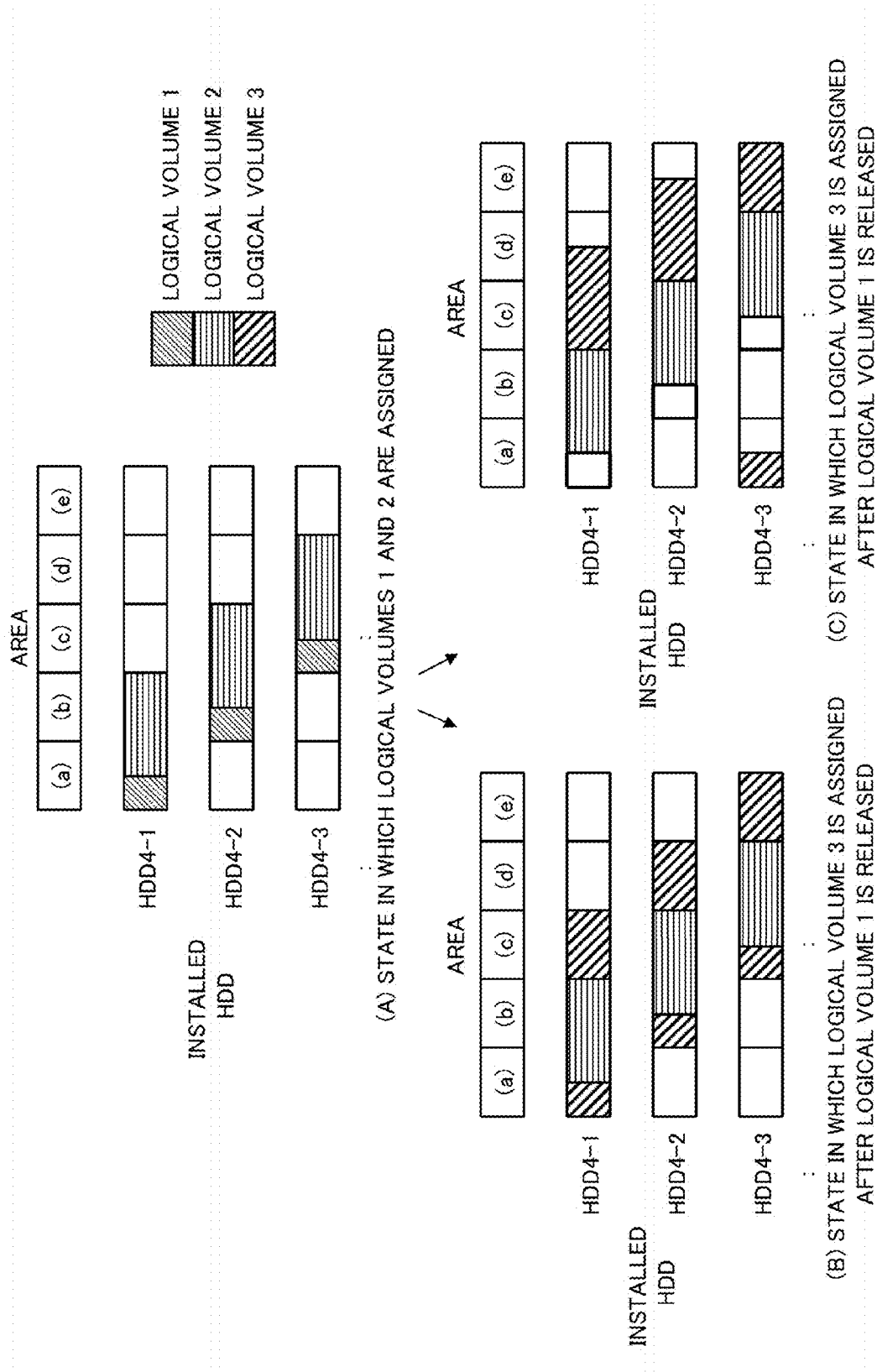
FIG. 13 is a diagram illustrating one example of an assignment start location when a logical volume is released and reassigned to the plurality of HDDs illustrated in FIG. 1.

FIG. 13 is a diagram illustrating one example of an assignment start location when the logical volume is released and reassigned to the plurality of HDDs 4 illustrated in FIG. 1. Note that, (A) in FIG. 13 illustrates one example of a status in which logical volumes 1 and 2 are assigned, and (B) and (C) in FIG. 13 illustrate one example of a status in which logical volume 3 is assigned after the logical volume 1 is released, respectively.

In the example of (A) in FIG. 13, the logical volumes 1 and 2 are assigned to each of the plurality of HDDs 4-1 to 4-5. Note that, when the HDD 4-3 is focused in (A) in FIG. 13, the logical volume 1 is assigned to a partial area of the area (c) and the logical volume 2 is assigned to the area (d) from a remaining area of the area (c).

In the status illustrated in (A) in FIG. 13, it is assumed that the logical volume 1 is released from the RAID group and there is a request for assigning the logical volume 3 after releasing. In this case, the logical volume assigning unit 213 may assign the logical volume 3 as illustrated in any one of (B) and (C) in FIG. 13.

For example, the logical volume assigning unit 213 may assign a part of the logical volume 3 to the area of the released logical volume 1 in accordance with the assignment order for each HDD 4 on the outer periphery, as illustrated in (B) in FIG. 13. Then, the logical volume assigning unit 213 may assign a remaining area of the logical volume 3 subsequently to the logical volume 2. Note that, when the HDD 4-3 is focused in (B) in FIG. 13, a part of the logical volume 3 is assigned to a partial area of the area (c) and the remaining area of the logical volume 3 is assigned to the area (e).

Alternatively, the logical volume assigning unit 213 may assign the logical volume 3 subsequently to the logical volume 2, as illustrated in (C) in FIG. 13. Note that, when the HDD 4-3 is focused in (C) in FIG. 13, a part of the logical volume 3 is assigned to the area (e) and the remaining area of the logical volume 3 is assigned to the area (a).

Like this, the logical volume assigning unit 213 may release and reassign the logical volume in any one method illustrated in (B) and (C) in FIG. 13. Note that, unlike (B) in FIG. 13, in the case of adopting the method illustrated in (C) in FIG. 13, the logical volume assigning unit 213 may assign the logical volume 3 without striding the logical volume 2 and dividing the logical volume 3. Therefore, the logical volume assigning unit 213 may reduce the number of seeking times of the head 4*c* and suppress performance degradation as compared with the method illustrated in (B) in FIG. 13, in the case of adopting the method illustrated in (C) in FIG. 13.

[1-4] Operational Example of CM

Figure 14:
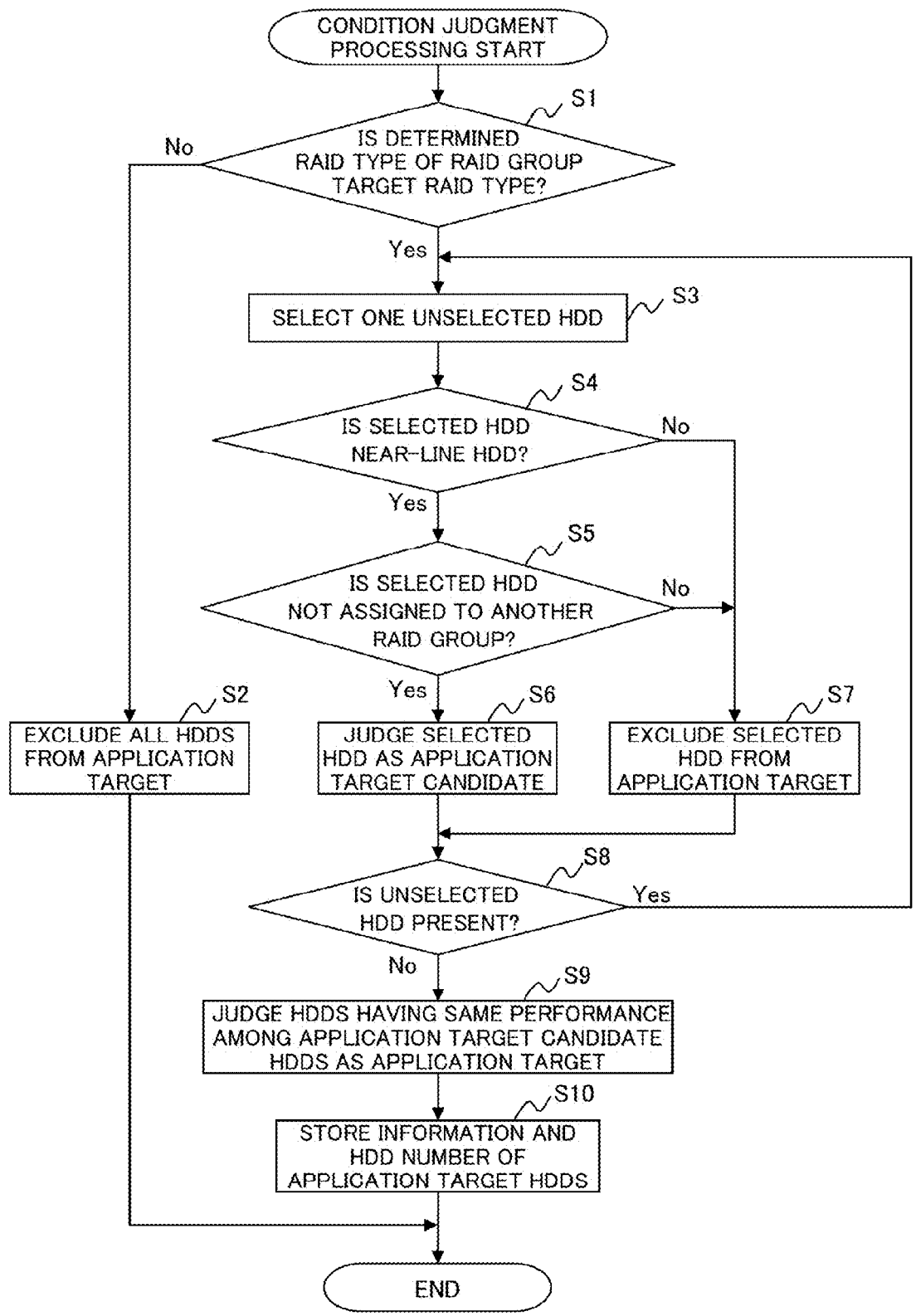
FIG. 14 is a flowchart illustrating one example of a condition judgment process by a condition judging unit illustrated in FIG. 2.
Figure 15:
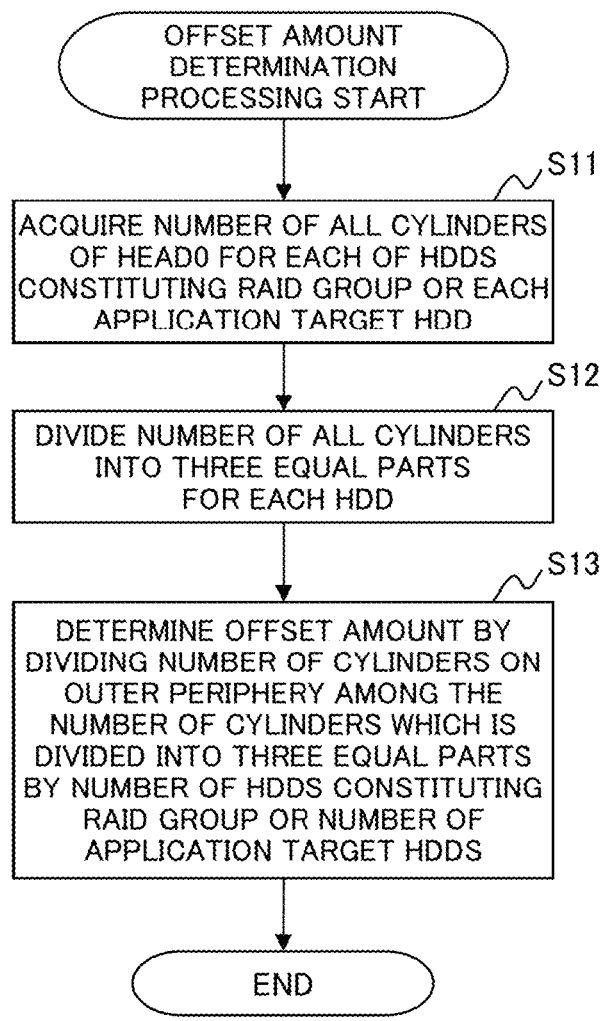
FIG. 15 is a flowchart illustrating one example of an offset amount determining process by an offset amount determining unit illustrated in FIG. 2.
Figure 16:
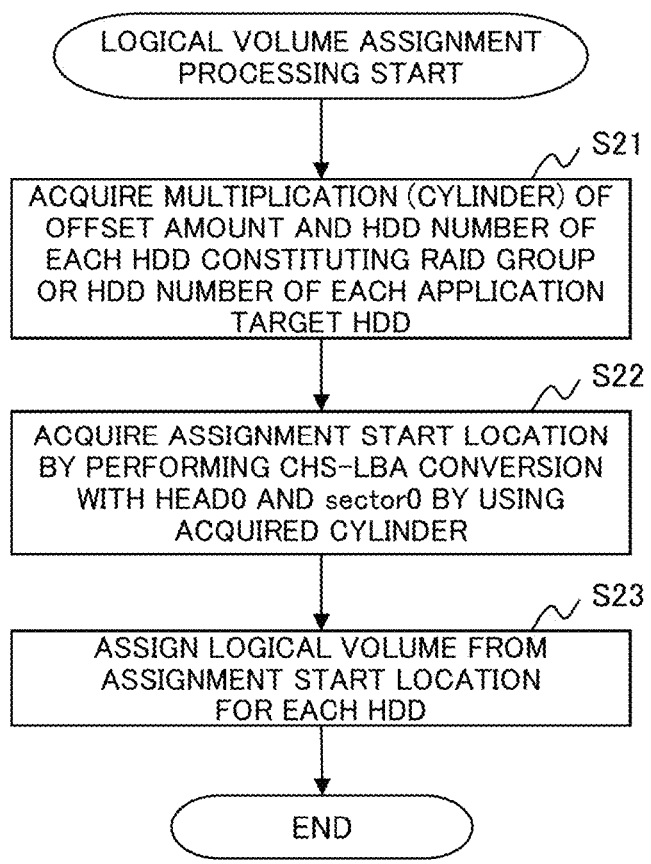
FIG. 16 is a flowchart illustrating one example of an assignment process of the logical volume by a logical volume assigning unit illustrated in FIG. 2.

Next, an operational example of the CM 2 (RAID controller 21) configured as above will be described with reference to FIGS. 14 to 16. FIG. 14 is a flowchart illustrating one example of a condition judgment process by the condition judging unit 211 illustrated in FIG. 2. FIG. 15 is a flowchart illustrating one example of the offset amount determining process by the offset amount determining unit 212. FIG. 16 is a flowchart illustrating one example of the assignment process of the logical volume by the logical volume assigning unit 213 illustrated in FIG. 2. Note that, in the following description, it is assumed that the offset cylinder amount is calculated as the offset amount.

[1-4-1] Condition Judgment Process

First, the condition judgment process by the condition judging unit 211 will be described with reference to FIG. 14.

Note that, it is assumed that it is determined that the RAID group is prepared by using the HDDs 4-1 to 4-5 by the RAID controller 21 in accordance with an instruction from a user or a manager.

As illustrated in FIG. 14, the condition judging unit 211 judges whether a RAID type of the determined RAID group is a target RAID type, for example, RAID 5 or RAID 6 (step S1; condition (ii)).

When it is judged that the RAID type of the determined RAID group is not the target RAID type (No route of step S1), the condition judging unit 211 judges that all HDDs 4 are not an application target (step S2), and as a result, the process ends. Note that, in this case, the determination of the offset amount by the offset amount determining unit 212 is suppressed and the logical volume assigning unit 213 assigns the logical volume to the assignment start location of the outermost portion in each HDD 4.

Meanwhile, in step S1, when it is judged that the determined RAID type is the target RAID type (Yes route of step S1), the condition judging unit 211 selects one unselected HDD 4 among the HDDs 4-1 to 4-5 constituting the RAID group (step S3). Then, the condition judging unit 211 judges whether the selected HDD 4 is the near-line HDD (step S4; condition (i)).

When the selected HDD 4 is judged as the near-line HDD (Yes route of step S4), the condition judging unit 211 judges whether the selected HDD 4 is assigned to other RAID groups (step S5; condition (iv)). When the selected HDD 4 is not assigned to other RAID groups (Yes route of step S5), the condition judging unit 211 judges that the selected HDD 4 is an application target candidate (step S6), and as a result, the process proceeds to step S8.

Meanwhile, in step S5 or step S6, when it is judged that the selected HDD 4 is not the near-line HDD or is assigned to other RAID groups (No route of step S5 or S6), the condition judging unit 211 judges that the selected HDD 4 is not the application target (step S7).

Next, in step S8, the condition judging unit 211 judges whether there is the unselected HDD 4. When it is judged that there is the unselected HDD 4 (Yes route of step S8), the process proceeds to step S3, and as a result, the condition judging unit 211 selects another unselected HDD 4. Meanwhile, when it is judged that there is no unselected HDD 4 (No route of step S8), the condition judging unit 211 judges that the HDD 4 having the same performance among HDDs 4 judged as the application target candidate in step S6 is the application target HDD (step S9; condition (iii)). Note that, in step S9, when a plurality of groups constituted by the HDDs 4 having the same performance is present, for example, when three HDDs 4 of 7200 rpm and two HDDs 4 of 5400 rpm are present, the condition judging unit 211 may judge that HDDs 4 of a group (a group of 7200 rpm) having more HDDs 4 are the application target HDD.

Then, information on the HDDs 4 judged as the application target HDD and the number of the corresponding HDDs 4 are stored in the storage area such as the memory 2b by the condition judging unit 211 (step S10), and the process ends.

As described above, since the condition judging unit 211 judges whether the HDD 4 is the application target HDD, it may be prevented the control by the logical volume assigning unit 213 from being applied to an inappropriate RAID type or HDD 4 and the performance degradation of the HDD 4 may be suppressed.

Further, since the respective HDDs 4 are comparatively evenly used in a RAID type in which the logical volume is assigned to the plurality of HDDs 4 through distribution (alternatively, mirroring), there is a high possibility that a simultaneous failure will occur in the plurality of HDDs 4. Therefore, by the judgment (condition (ii)) of step S1, the control by the logical volume assigning unit 213 may be applied to the RAID type in which there is a high possibility that the simultaneous failure will occur and the occurrence probability of the simultaneous failure may be efficiently reduced.

Further, in the judgment (condition (i)) of step S4, the control by the logical volume assigning unit 213 may be applied to a near-line HDD which is comparatively cheap, and has a large capacity and low quality, and the occurrence probability of the simultaneous failure may be efficiently reduced.

Note that, as described above, the judgment (condition (ii)) of step S1, the judgment (condition (i)) of step S4, the judgment (condition (iv)) of step S5, and the process (condition (iii)) of step S9 may be appropriately omitted or processing orders thereof may be changed.

[1-4-2] Offset Amount Determining Process

Next, the offset amount determining process by the offset amount determining unit 212 will be described with reference to FIG. 15.

As illustrated in FIG. 15, the offset amount determining unit 212 acquires the number of all cylinders of any one platter (for example, "Head0") for each of the HDDs 4 constituting the RAID group or for each HDD judged as the application target by the condition judging unit 211 (step S11).

Subsequently, the offset amount determining unit 212 divides the acquired number of all corresponding cylinders for each HDD 4 into three equal parts (step S12).

Then, the offset amount determining unit 212 determines an offset cylinder amount (offset amount) by dividing the number of cylinders on the outer periphery among three equal parts by the number of HDDs 4 constituting the RAID group or the number of the application target HDDs 4 (step S13).

Note that, as described above, the offset amount determining unit 212 may omit determination of the offset amount for a part of the plurality of HDDs 4 and may representatively determine the offset amount with respect to any one HDD 4 (for example, the HDD 4-1). As a result, the offset amount determining unit 212 may divert the offset amount of the representative HDD 4 (4-1) to offset amounts of other HDDs 4 and may shorten a processing time.

[1-4-3] Assignment Process of Logical Volume

Next, the assignment process of the logical volume by the logical volume assigning unit 213 will be described with reference to FIG. 16.

As illustrated in FIG. 16, the logical volume assigning unit 213 acquires the product (cylinder) of the offset amount and the HDD number of each HDD 4 constituting the RAID group or the HDD number of each HDD 4 judged as the application target by the condition judging unit 211 (step S21).

Subsequently, the logical volume assigning unit 213 performs CHS-LBA conversion by using the acquired cylinder while setting "Head0" and "Sector0" and acquires the assignment start location (step S22).

Then, the logical volume assigning unit 213 assigns the logical volume from the assignment start location for each HDD 4 (step S23).

Note that, as described above, the logical volume assigning unit 213 may divert the offset amount of the representative HDD 4 (4-1) to the plurality of HDDs 4 when the offset amount determining unit 212 determines the offset amount representatively with respect to any one HDD 4 (for example, HDD 4-1). As a result, the logical volume assigning unit 213 may shorten the processing time of step S21.

As described above, according to the CM 2 of the embodiment, the logical volume assigning unit 213 assigns the assignment start locations of the logical storage areas of the plurality of HDDs 4 to respectively different physical locations.

As a result, a status in which the assignment start locations of the logical volumes of the plurality of HDDs 4 constituting the RAID group are physically different from each other may be implemented. That is, since a physical use location of the disk 4a may be distributed for each HDD 4, the occurrence probability of the simultaneous failures of the plurality of HDDs 4 caused by a predetermined location (in particular, outer periphery) of the disk 4a may be reduced. Accordingly, the reliability of the storage device 1 is improved.

Figure 17:
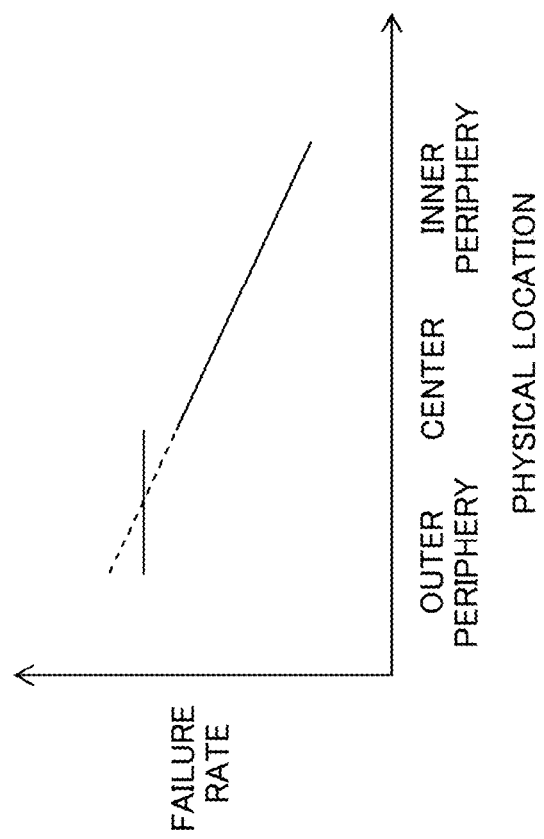
FIG. 17 is a diagram illustrating one example of a failure rate of a near-line HDD depending on a physical location of a disk when an offset is provided on the outer periphery of the HDD illustrated in FIG. 1.
Figure 18:
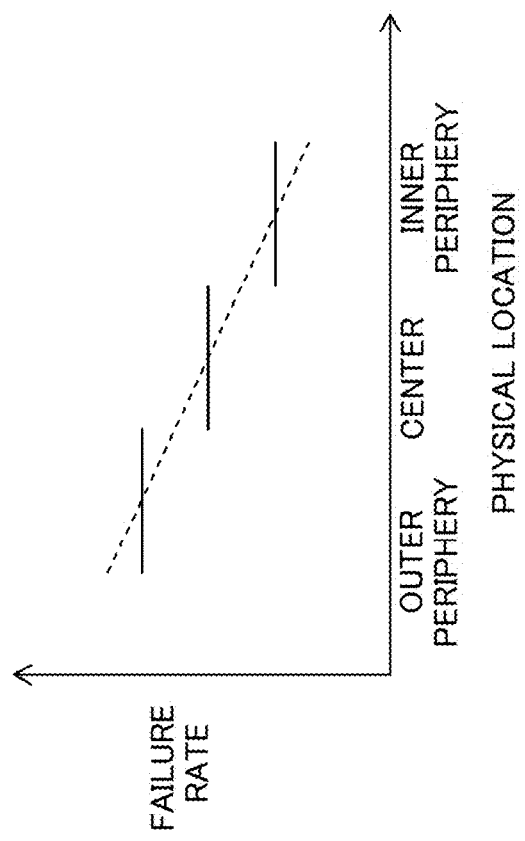
FIG. 18 is a diagram illustrating one example of a failure rate of a near-line HDD depending on a physical location of a disk when an offset is provided on each of the outer periphery, the center, and the inner periphery of the HDD illustrated in FIG. 1.
Figure 19:
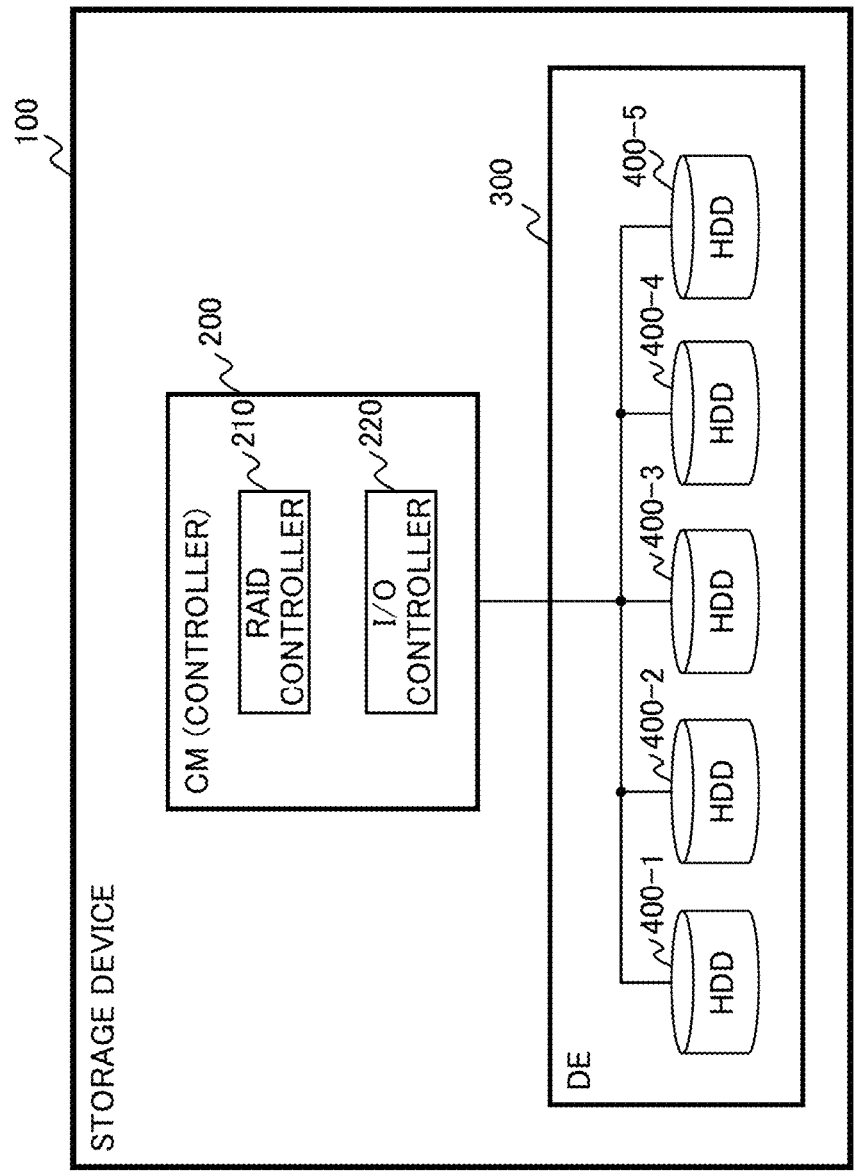
FIG. 19 is a diagram illustrating a configuration example of a RAID device.

As one example, the case in which the logical volume assigning unit 213 assigns the assignment start locations of the logical volumes to respectively different physical locations so that the cylinder addresses are different from each other in the plurality of HDDs 4 will be described. FIG. 17 is a diagram illustrating one example of a failure rate of a near-line HDD depending on a physical location of a disk 4a when the offset is provided on the outer periphery of the HDD 4 illustrated in FIG. 1. FIG. 18 is a diagram illustrating one example of a failure rate of a near-line HDD depending on a physical location of a disk 4a when the offset is provided on each of the outer periphery, the center, and the inner periphery of the HDD 4 illustrated in FIG. 1.

In FIG. 17, a solid line part indicates the relationship between a failure rate (an average value of the failure rates of the respective HDDs 4) expected when outer peripheries of the plurality of HDDs 4 (near-line HDDs) constituting the RAID group include different offsets by the CM 2 according to the embodiment and the physical location of the disk 4a. Further, a dotted line part indicates the relationship between a failure rate (an average value of failure rates of the respective near-line HDDs) expected when the offset is not provided in the plurality of near-line HDDs and the physical location of the disk. As illustrated in FIG. 17, according to the CM 2 of the embodiment, the failure rate of the outer periphery of the disk 4a may be averaged and the occurrence probability of the simultaneous failures of the plurality of HDDs 4 may be reduced.

Further, in FIG. 18, a solid line part indicates the relationship between a failure rate (an average value of failure rates of the respective HDDs 4) expected when different offsets are provided even with respect to the center and the inner periphery of the disk 4 in addition to the case of FIG. 17 and the physical location of the disk 4a. Further, a dotted line part similarly indicates the same as in FIG. 17. As illustrated in FIG. 18, according to the CM 2 of the embodiment, the failure rates of the outer periphery, the center, and the inner periphery of the disk 4a may be averaged, respectively, and the occurrence probability of the simultaneous failures of the plurality of HDDs 4 may be further reduced.

Further, according to the CM 2 of the embodiment, an increase in manufacturing cost of the storage device 1 (CM 2) may be reduced, without performing a rotational control among the HDDs 4 and providing a constraint in an address conversion order between CHS and LBA.

[2] Others

As described above, although the preferred embodiment of the invention has been described in detail, the invention is not limited to the specific embodiment, and various modifications and changes can be made within the scope without departing from the spirit of the invention.

For example, in the embodiment described above, the condition judging unit 211 judges whether the plurality of HDDs 4 constituting the RAID group is the application target HDD in accordance with at least one condition of the conditions (i) to (iv), but the invention is not limited thereto. For example, when the application target HDD is not limited to the near-line HDD, the RAID type, or the like, the RAID controller 21 may invalidate or not include the condition judging unit 211.

Further, all or some of various functions of the storage device 1 according to the embodiment may be implemented by executing a predetermined program in a computer (including a CPU, an information processing apparatus, and various terminals).

The program is provided in a format recorded in computer-readable recording media such as flexible disk, CD (CD-ROM, CD-R, CD-RW, or the like), DVD (DVD-ROM, DVD-RAM, DVD-R, DVD-RW, DVD+R, DVD+RW, or the like), a Blu-ray disk. In this case, the computer reads the program from the recording media and transmits the read program to an internal storage device or an external storage device and thereafter, stores and uses the transmitted program.

Herein, the computer is a concept including hardware and an operating system (OS) and represents hardware which operates under a control from the OS. Further, when the OS is unnecessary and an application program singly operates the hardware, the hardware itself corresponds to the computer. The hardware at least includes a microprocessor such as the CPU and method for reading a computer program recorded in the recording medium. The program includes a program code to implement various functions of the CM (controller, control device) 2 of the embodiment in the computer described above. Further, some of the functions may be implemented not by the application program but by the OS.

According to the disclosed technology, the occurrence probability of the multiple failures of the plurality of disk devices constituting the disk group can be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control device controlling a plurality of disk devices to which a physical storage area is assigned in response to a logical storage area accessed from an upper device, comprising:
a processor,
wherein the processor assigns an assignment start location of the logical storage area of the plurality of disk devices to respectively different physical locations.

2. The control device according to claim 1, wherein the processor assigns the assignment start location of the logical storage area to the respectively different physical locations such that one or more addresses of a cylinder address, a sector address, and a head address are different in the plurality of disk devices in the assignment processing.

3. The control device according to claim 1, wherein the processor,
determines an offset amount of the physical location in the plurality of disk devices based on any one range of a plurality of ranges acquired by partitioning an entire data storage area in at least one disk device among the plurality of disk devices and the number of the plurality of disk devices.

4. The control device according to claim 3, wherein the processor assigns another logical storage area subsequent to a final location to which the processor assigns the logical storage area in the plurality of respective disk devices, when receiving an assignment request of the another logical storage area in the processing of assigning the logical storage area.

5. The control device according to claim 4, wherein the processor assigns an unassigned logical storage area from an outermost peripheral location of an assignable storage area when the assignable storage area is present within the one range, while assigns the unassigned logical storage area from a location which is out of the one range when no assignable storage area is present within the one range, when the logical storage area or the another logical storage area is assigned up to an innermost peripheral location of the one range in the processing of assigning the logical storage area.

6. The control device according to claim 3, wherein the processor,
   judges whether the plurality of respective disk devices is assignment target disk devices of the logical storage area based on the offset amount in the processing of assigning, based on information on the plurality of disk devices,
   determines the offset amount with respect to the disk device judged as the assignment target disk device by the judgment processing, in the processing of determining the offset amount, and
   acquires the assignment start location with respect to each of the assignment target disk devices and assigns the logical storage area from each assignment start location of the assignment target disk device, in the processing of assigning the logical storage area.

7. The control device according to claim 6, wherein the processor judges the plurality of respective disk devices as the assignment target disk device when the number of disk rotations is less than a predetermined value, in the judgment processing.

8. The control device according to claim 6, wherein the processor,
   when judging that at least one of the plurality of disk devices is not the assignment target disk device by the judgment processing,
   assigns the logical storage area from the outermost peripheral location of each storage area of the disk device judged not to be the assignment target disk device in the processing of assigning the logical storage area.

9. A storage device, comprising:
   a plurality of disk devices; and
   a control device controlling a plurality of disk devices to which a physical storage area is assigned in response to a logical storage area accessed from an upper device,
   wherein the control device includes a processor, and
   wherein the processor assigns an assignment start location of the logical storage area of the plurality of disk devices to respectively different physical locations.

10. A non-transitory computer-readable recording medium having stored therein a control program for causing a computer to execute a process for controlling a plurality of disk devices to which a physical storage area is assigned in response to a logical storage area accessed from an upper device, the process comprising:
   assigning an assignment start location of the logical storage area of each of the plurality of disk devices to respectively different physical locations.

11. The non-transitory computer-readable recording medium having stored therein a control program according to claim 10, wherein the assignment start location of the logical storage area is assigned to the respectively different physical locations such that one or more addresses of a cylinder address, a sector address, and a head address in the plurality of disk devices are different in the process of assigning.

12. The non-transitory computer-readable recording medium having stored therein a control program according to claim 10, the process further comprising:
   determining an offset amount of the physical location in the plurality of disk devices is executed in the computer, wherein
   the offset amount is determined based on any one range of a plurality of ranges acquired by partitioning an entire data storage area in at least one disk device among the plurality of disk devices and the number of the plurality of disk devices, in the process of determining the offset amount.

13. The non-transitory computer-readable recording medium having stored therein a control program according to claim 12, wherein another logical storage area is assigned subsequent to a final location to which the logical storage area is assigned in the plurality of respective disk devices, when receiving an assignment request of the another logical storage area in the process of assigning the logical storage area.

14. The non-transitory computer-readable recording medium having stored therein a control program according to claim 13, wherein an unassigned logical storage area is assigned from an outermost peripheral location of an assignable storage area when the assignable storage area is present within the one range, while the unassigned logical storage area is assigned from a location which is out of the one range when no assignable storage area is present within the one range, when the logical storage area or the another logical storage area is assigned up to an innermost peripheral location of the one range in the process of assigning the logical storage area.

15. The non-transitory computer-readable recording medium having stored therein a control program according to claim 12, the process further comprising:
   judging whether the plurality of respective disk devices is assignment target disk devices of the logical storage area based on the offset amount, based on information on the plurality of disk devices, wherein:
   the offset amount is determined with respect to the disk device judged as the assignment target disk device by the process of judging, in the process of determining the offset amount,
   the assignment start location is acquired with respect to each assignment target disk device, in the process of acquiring the assignment start location, and
   the logical storage area is assigned from each assignment start location of the assignment target disk device, in the process of assigning the logical storage area.

16. The non-transitory computer-readable recording medium having stored therein a control program according to claim 15, wherein the plurality of respective disk devices is judged as the assignment target disk device when the number of disk rotations is less than a predetermined value, in the process of judging.

17. The non-transitory computer-readable recording medium having stored therein a control program according to claim 15, wherein:
   when at least one of the plurality of disk devices is judged not to be the assignment target disk device by the process of judging,
   the logical storage area is assigned from the outermost peripheral location of each storage area of the disk device judged not to be the assignment target disk device, in the process of assigning the logical storage area.

* * * * *